March 28, 1967     M. W. WOLFE     3,311,153

VALVE MEMBER AND METHOD OF USE

Filed Sept. 4, 1964

INVENTOR.
MERRITT W. WOLFE
BY
*J. B. Holden*
ATTORNEY 3,311,153
VALVE MEMBER AND METHOD OF USE
Merritt W. Wolfe, Akron, Ohio, assignor to The Goodyear Tire & Rubber Company, Akron, Ohio, a corporation of Ohio
Filed Sept. 4, 1964, Ser. No. 394,480
2 Claims. (Cl. 152—429)

This invention relates to an improvement in valves and methods of applying the same. One of the objects of the present invention is to provide an improved valve structure which may be inserted in the hole of a pneumatic tubeless tire while the tire is still on the vehicle and thereby eliminate the need for demounting and remounting the tire where it is desired to insert dry or liquid ballast material. A further object is to provide a valve installation usable where a planetary gear or other obstructions prevents the use of conventional type rim valves. Other objects of this invention will appear in the course of the following description.

To the accomplishment of the foregoing and related ends, said invention then consists of the means and method hereinafter fully described and particularly pointed out in the claims. The annexed drawing and the following description set forth in detail certain means and methods embodying the invention.

Figure 1:
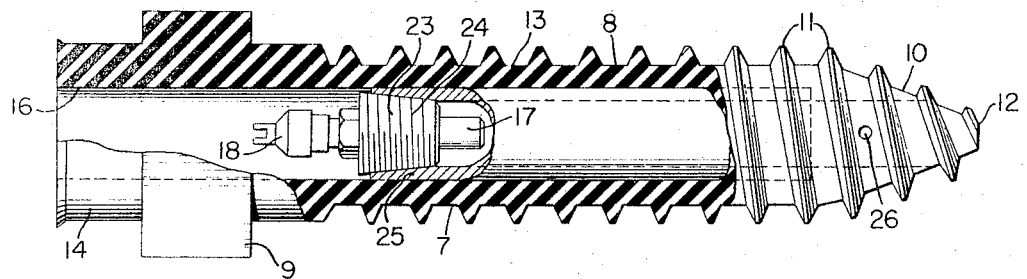
Figure 2:
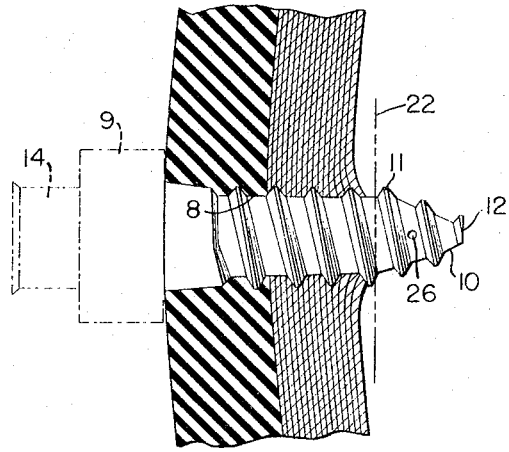
Figure 3:
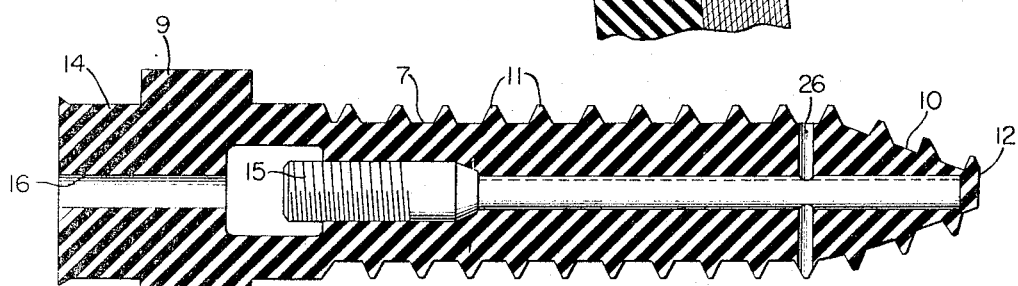
Figure 4:
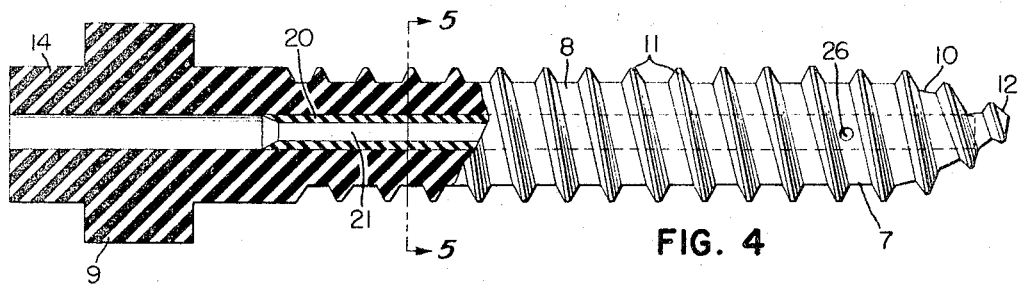
Figure 5:
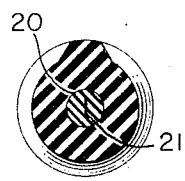

In said annexed drawing FIG. 1 is a side elevational view in partial section of the valve member embodying the principles of the invention. FIG. 2 is a view in partial cross section of the pneumatic tire showing the valve member in place within the wall of the tire. FIG. 3 is a partial view in cross section of the valve member showing one embodiment of the valve element within FIG. 2. FIG. 4 is a partial cross-sectional view of another embodiment of the valve member and FIG. 5 is a view along line 5—5 of FIG. 4.

As is clearly shown in FIGS. 1 and 2 of the drawing the valve member in a simpler form comprises an elongated member 7 having a cylindrical section 8 with a wrenching means 9 such as a square or hex-head positioned intermediate thereof, a tapered end section 10 having a helical ridge 11 extending from the end 12 of the elongated member through the intermediate section 13.

The elongated member preferably has a flange 14 near the head end thereof as this flange permits the distance between the wrenching means and the end to be minimized and yet the elongated member still may be handled when cold without tongs or the fingers slipping off of the cylindrical section between the wrenching means and the head end. Preferably the flange is in the shape of a frustum of a cone.

One form of the interior of the valve member is shown in FIG. 3 where the valve assembly 15 is positioned centrally of the valve body and extends axially from the end 12 or near thereof to near the shoulders of wrenching means 9.

The valve assembly may be any of those that are nomally used in tires. For instance, such as the valve assembly shown in FIGS. 3 and 4. Referring specifically to FIG. 1 the valve assembly is placed within the opening 16 of the valve member and is fastened in position with a suitable adhesive or other means. The valve assembly comprises a valve core 17 having a valve seat therein and a spring actuated piston means extending up through the core and the upper end of the core is threaded to receive a cap 18 to close the core and prevent dirt and other foreign matter from getting stuck within the core and jamming the valve and its plunger.

Referring to FIG. 3 the valve assembly here comprises a long metal tube which extends through the hollow of the valve member and has positioned on the head end thereof the assembly 15 containing the valve seat and spring actuated plunger connected to the valve and a threaded portion to receive the cap when the hex-head is cut off.

It is not necessary that the valve assembly contain metallic parts. It is possible to fill the hollow of the valve member with a soft, highly elastic rubber 20 and have a hole 21 extending therethrough, in accordance with the teachings of the Perry patents, U.S. 1,992,764 and U.S. 1,923,501. A valve of this type contains a hole 21 in the soft rubber part 20 through which a needle may be inserted to inflate the tire or other article. It should be indicated the soft, highly elastic rubber is under sufficient compression to close the hole when the needle or other inflating means is removed.

The rubber of the body of the valve member should have a Shore A hardness of at least 60 and preferably in the range of 75–95 or some higher. Where the rubber is either natural or a snythetic polymer or copolymer of a conjugated diene, it is a preferred practice that the valve core be a relatively stiff member such as a metal tube or fitting.

Where the body of the valve member is made of polyurethane rubber, there is no need for the valve core to be metallic if the polyurethane has a Shore A hardness at 75° F. of at least 60 and preferably in the range of 75 to 95 and a tensile strength of at least 2000 and preferably 3500 to 5500 pounds per square inch. Also, the use of a polyurethane body for the valve member gives a more desirable valve assembly than is obtained with the other reinforced rubbers. Polyurethane rubbers of this type are well known and may be made by forming a liquid reaction mixture comprising a reactive hydrogen containing polymeric material such as the polyetherpolyols, polyesterpolyols, polyesteramides and mixtures of these of about 700 to 3500 molecular weight and about 1.1 and preferably 1.3 to more than 2 mols of an organo polyisocyanate for each mole of reactive hydrogen-containing polymeric material and a sufficient amount of a crosslinking agent selected from the class consisting of the diamines, the glycols and the amino alcohols to react with the excess of organo polyisocyanate and then pouring the liquid reaction mixture into a mold having the shape shown in FIG. 1 where the liquid reaction mixture is heated and cured to give a repair element of the desired size.

The polyesters used in the practice of this invention are those conventionally prepared by the condensation reaction between one or more dicarboxylic acids and one or more glycols. Representative examples of the dicarboxylic acids which may be used in preparing these polyesters are: succinic, glutaric, adipic, pimelic, suberic, azelaic and sebacic. Of these acids adipic, glutaric and sebacic are particularly preferred. Representative examples of the glycols which may be used to prepare the polyesters are ethylene glycol, propylene glycol, butylene glycol, pentamethylene glycol and hexamethylene glycol. Of these ethylene glycol, propylene glycol and mixtures of these two glycols are particularly preferred.

As indicated above, the polyester should preferably have a naverage molecular weight of from 1500 to 2500 and a corresponding hydroxyl number of from 45 to 75 with an acid number not greater than 5. The molecular weight range indicated defines the polyesters which are of the proper consistency for pouring in the liquid state either at room temperature or at relatively low temperatures, and which yield cured polymers possessing outstanding physical properties.

Of particular interest are the polyesters prepared from adipic acid and a mixture of glycols containing approximately 80 mol percent of ethylene glycol and 20 mol percent of propylene glycol in the molecular weight range of approximately 2000 and having an acid number not greater than 2.

The polymeric polyether polyols such as polypropylene ether glycol or polytetramethylene ether glycols having molecular weights of about 1500 to 3500 may be used in place of the polyesters for making the polyurethane repair elements of this invention. Although it should be appreciated that the polyether urethanes usually do not have as much tear resistance and as high a tensile strength properties as the corresponding polyester urethanes.

As is well recognized in the production of polyurethane products, an excess of diisocyanate is generally employed to insure the cure of the polyester and to provide sufficient points of reaction with other ingredients containing reactive hydrogen such as ortho dischlorobenzidine or methylene-bis-ortho-chloraniline.

Any of the wide variety of organic diisocyanates may be employed to prepare the polymers of this invention including aromatic, aliphatic and cycloaliphatic diisocyanates and mixture of two or more of these. Representative compounds include the meta tolylene diisocyanates such as 2,4-tolylene diisocyanate and 2,6-tolylene diisocyanate; m-phenylene diisocyanate; 4,4'-diphenylene diisocyanate; 4,4'-diphenylene methane diisocyanate; 1,5-naphthylene diisocyanate; dianisidine diisocyanate; 4,4'-tolidine diisocyanate; 4,4'-diphenyl ether diisocyante; 1,4-tetramethylene diisocyanate; 1,6-hexamethylene diisocyanate; 1,10-decamethylene diisocyanate; 1,4-cyclohexylene diisocyanate; 4,4'-methylene-bis-(cyclohexyl isocyanate) and 1,5-tetrahydro-naphthylene diisocyanate. Of these the aromatic isocyanates, and particularly the tolylene diisocyanates 4,4'-tolidine diisocyanate and 4,4'-diphenylene methane diisocyanate are preferred. The diisocyanates may contain other substituents such as alkyl or halogen but should contain no groups such as hydroxyl or amino groups which are reactive with the isocyanate radicals.

Suitable crosslinkers are the class of chemical compounds known as diamines, glycols and amino alcohols. The specific nature of these crosslinkers are well known and described in the literature. The specific diamines that are preferred for making cast polyurethanes are the chloro diamines or other slow diamines as those materials yield a reaction mixture which has sufficient pot life to permit liquid castings to be made without having to resort to special operating conditions.

A particularly effective formulation from the standpoint of the physical properties of the cured product and the physical nature of the liquid mixture is one containing approximately 100 parts by weight of a polyester having an average molecular weight of approximately 2000, approximately 6 parts by weight of ortho dichlorobenzidine and approximately 23 parts by weight of 3,3'-dimethyl 4,4'-diphenylene diisocyanate. Methylene-bis-ortho chloroaniline also can be used instead of ortho dichlorobenzidine with the above recipe to make a cast repair element which is suitable for permanent as well as temporary repair.

The castable polyurethane reaction product of this invention is prepared by heating the polyester or a polytetra-methylene ether glycol to a temperature of from 100° C. to 140° C., adding the diisocyanate followed by a thorough mixing or blending of the reactants for from 30 to 45 minutes, adding a cross-linker such as a diamine followed by a thorough blending of this reactant into the mixture for approximately one minute and by pouring the complete reaction mixture into a mold of the desired size and shape. While the reaction mixture will set up without the application of additional heat, it has been found expedient to place the cast product into a heated air oven or to heat the mold by some other means, as for instance in a curing press in order to accelerate the rate of cure of the reaction mixture. The application of pressure during the oven curing operation has been found not to be necessary or required. However, the application of pressure to products cured in a press has been found to produce beneficial results.

The invention is further illustrated but not limited by by the following examples, where the parts and percentages are by weight unless otherwise indicated.

*Example I*

A polyester (100 parts) prepared from adipic acid and a mixture of glycols containing 80 mol percent of ethylene glycol and 20 mol percent of propylene glycol and having an average molecular weight of approximately 2000 and a hydroxyl number of approximately 57 and an acid number of 0.8 was heated at 120° C. for one hour under a vacuum of 20 millimeters of mercury. To this polyester 23 parts by weight of 3,3'-dimethyl-4,4'-diphenylene diisocyanate were added. The mixture was stirred for 30 minutes at 120° C. under a vacuum of 20 millimeters of mercury. Ortho dichlorobenzidine (6 parts by weight) was then added and mixed with the polyester and diisocyanate for one minute, after which the complete reaction mixture was poured into a mold having the configuration of the drawings which contained a valve assembly positioned therein. The cast composition was cured for one hour at 120° C. The cast valve member was then removed from the mold and baked for an additional 20 hours at 120° C.

A valve member also was made by using butane diol instead of ortho dichlorobenzidine as the crosslinker in accordance with the above procedure.

A hole is made in the side wall of a pneumatic tubeless tire by burning with a hot rod, by drilling or other well known practices. For best results, the hole is cleaned and enlarged to give a smooth round hole all the way through the tire. This cleaning and enlarging of the hole can be accomplished by drilling the debris from the hole with a drill. Another method of cleaning out the hole is to burn with a hot rod. By this burning technique the carcass cord ends are sealed and the thin layer of burned rubber has a lubricating value during the insertion of the valve member. The valve member of FIG. 1 which has been cooled to a temperature less than 0° F., preferably —35° F. or lower in a dry ice-kerosene bath or with other suitable refrigeration means is inserted into the hole in the tire and turned with a wrench or other means to force the valve member while still frozen through the hole in the tire. Then the head end of the valve member is cut off (as shown by dotted line 22) smooth with the surface of the tire with a knife or hacksaw. Care should be taken to position the valve member in the hole so the valve assembly will not project beyond the tire surface. This tire may be inflated by attaching an air line to the valve.

It has been found to be desirable to coat the inside of the hole and the valve member with a lubricating cement prior to the insertion of the valve member into the hole. The use of the lubricating cement performs several functions: (1) it facilitates the insertion of the valve member into the hole; (2) it also reduces the amount of moisture which tends to condense on the cold valve member from being transported inside the tire carcass; and (3) the cement also increases the resistance to removal of the valve member from the tire carcass; and (4) provides air sealing between the hole and the valve members.

The size of the valve member at the thread root diameter should be at least greater than the maximum dimension of the hole made in the side wall of the tire and to be sealed. It is preferred that it be at least 1.5 to 2 times the size of the maximum diameter of the hole to be sealed as this appreciability enhances the resistance to removal of the plug.

Any of the usual liquid rubber thread cements may be used as the lubricant for the repair element. These cements usually contain less than about 50% by weight of solids with the rest of the cement being a suitable solvent for the solids. Generally, the suitable solvents are the aromatic naphthas, light petroleum distillates, the pure hydrocarbons such as benzene, hexane, etc. The solid content of the cement usually comprises from about 5 to 40% of a rubbery polymer such as natural rubber or the synthetic rubbers, for example, the polymers and/or copolymers of the conjugated dienes such as butadiene, isoprene, chloroprene, etc. In addition to the rubber the solid content of the cement may contain from about 10 to 35% of a resinous material such as, for instance, the phenol-formaldehyde resins. The cement also may contain a sulfur curing agent such as sulfur, accelerators, reinforcing agents and the other compounding agents normally used in tread cements.

The prepolymers, such as those of Examples 1, 2 and 3 may also be used as a cement in the practice of this invention.

A special cement which has been found to be exceptionally good for use in the practice of this invention is the polyurethane cement obtained when dimethyl formamide, dimethyl acetamide, dimethyl propionamide and dimethyl sulfoxide or mixtures of these solvents is used to disolve a cured polyurethane of the type shown in Example 2. Normally these polyurethane cements will contain from about 10 to 50% by weight of the cured polyurethane.

*Example II*

Into a suitable container was placed 900 grams of a polyester prepared from the condensation of approximately 1.1 mols of a mixed glycol of ethylene glycol, diethyleneglycol, and butanediol-1,4 in equal molar quantities with approximately 1.0 mol of adipic acid. This polyester had an hydroxyl number of approximately 60 and an acid number of approximately one (resulting in a "reactive number" of 61) and a molecular weight of approximately 1800. To this polyester were added 92.7 grams of a mixture of 98 parts by weight of 2,4-tolylene diisocyanate and 2 parts by weight of 2,6-tolylene diisocyanate. This mixture was stirred for 36 minutes while being maintained at a temperature ranging from 50° C. to 630 C. (This partially diisocyanate-modified polyester is called a prepolymer.) To this prepolymer were added 222 grams of a mixture of 98 parts by weight of 2,4-tolylene diisocyanate and 2 parts by weight of 2,6-tolylene diisocyanate, and 13.5 grams of castor oil. The mixture was then transferred to a 2-quart Baker-Perkins Sigma-blade mixer and 6.3 grams of catalyst (the condensation product of 1 mol of aniline and 4 mols of n-butyraldehyde) were added. After mixing for 4 minutes, 27.3 grams of water were added at which time the mixture began to foam, this foam was destroyed by the shearing action of the Sigma-blades. Some 3 minutes after the addition of the water, 5 cubic centimeters of N-methyl morpholine (another catalyst) were added. After this mixture had been allowed to mix for a period of approximately 20 minutes in the Barker-Perkins mixer, the formation of elastomer was observed. The mixing was continued for an additional 30-minute period, during which time the elastomer was reduced to a powdered form. This was done to allow ease of handling and removal of the elastomer from the mixer. This powdered elastomer was heated in a 100° C. oven for 60 minutes to complete the cure.

A hundred grams of the powdered cured polyurethane was dissolved in 150 grams of dimethyl formamide. This cement was used to lubricate the inside of a cleaned and enlarged puncture hole in a tire and to coat a polyurethane repair element prior to the insertion of the cold valve member into the hole of the tire. While the head of the polyurethane valve member was still frozen, a hacksaw was used to cut it off even with the thread of the tire. The tire was mounted on a rim and then inflated with air from a hose. This tire has been in use for several hours and still does not show any loss in inflation.

*Example III*

A mol of polytetramethylene ether glycol of about 1800 molecular weight was reacted with about 1.8 mols of 4,4'-diphenylene methane diisocyanate to form a prepolymer, then about .8 mol of methylene bis ortho chloro aniline was added to and mixed into the prepolymer. The resulting liquid reaction mixture was poured into a mold for a valve member having a valve positioned centrally and axially of the mold. The mold containing the liquid reaction mixture was placed in a 100° C. oven until the reaction mixture had set and cured. This polyurethane valve member was placed in the side wall of a pneumatic tire and then the tire mounted on a rim was inflated by insertion of a needle through the hole 21 of soft rubber seal or plug 20.

This invention permits a polyurethane valve member to be screwed into the hole in the tire since the valve member which has either polyurethane rubber or rubber reinforced with a stiffening means hardens up faster than the tire rubber at lower temperatures. For instance, a chilled polyurethane valve member increases 20 to 30 Shore A hardness units as the temperature of the element is changed from ambient to 0° F. and even lower, say to −65° F. On the other hand, it is unexpected that the flexing of the polyurethane valve member in the tire prevents it from hardening to the point where it would work out of the tire even when the tire is operating at sub-zero temperatures.

Example IV illustrates an embodiment of this invention which offers unusual advantages where the tire is to be filled with the so-called solid or particulated ballasts.

*Example IV*

A one inch diameter hole may be bored through the center of the thread of a tire, such as used in off-road equipment. Then a valve member may be placed in the hole and sealed in place by the procedures of Examples I to III. Where solid ballast is used, the portion of the valve member extending beyond the line 22 should be cut off to reduce frictional contact with the ballast. This may cut away the portion having vent hole 26 but this does not matter as the tire will not be inflated with air. The ballast easily may be poured into the cavity formed by the tire and the rim of the wheel by positioning the wheel and tire whereby the valve member is vertically above the axle. Then the valve assembly 23 can be removed by unscrewing the threaded tapered body portion 24 from the threaded sleeve 25. With the valve assembly 23 removed the opening 16 in the valve member permits the solid ballast to pour or drop into the cavity formed by the tire and wheel. Also, with the valve in this position no trouble is experienced in completely filling said cavity.

The opening 16 is closed by screwing the valve assembly back into the sleeve 24.

In an alternate embodiment the ballast may be added through the hole in the tire and then the valve member is inserted in the hole in accordance with the procedure described in the foregoing examples. The valve assembly may be screwed into the valve member either before or after the valve member is sealed into the hole.

While certain representative embodiments and details have been shown for the purpose of illustrating the invention, it will be apparent to those skilled in this art that various changes and modifications may be made therein without departing from the spirit or scope of the invention.

What is claimed is:

1. A valve member comprising an elongated cylindrical hollow section having a helical ridge on its surface and having a taper at one end and a wrenching means on the other end, said cylindrical section having a valve assembly sealed axially within the hollow thereof but positioned a sufficient distance away from the wrenching means to permit the wrenching means to be cut away after the wrenching means has been used to insert the valve member in a hole of a wall of a tire to leave the new end of the cylindrical section formed by the cutting away of the cylindrical section substantially even with the wall of the tire, said helical ridge extending over the length of the cylindrical section from about the tapered end to thereby provide means for securing the valve member in said hole.

2. A pneumatic tire having a valve positioned in the side walls thereof, said valve comprising an elongated cylindrical hollow section having one end substantially flush with the outside surface of the tire and a tapered end extending at least to the inside of the tire, said cylindrical section having a valve assembly sealed in an axial position therein and a helical ridge extending over the surface thereof to provide a means for securing the valve within the hole.

References Cited by the Examiner

UNITED STATES PATENTS

| | | | |
|---|---|---|---|
| 570,942 | 11/1896 | Merritt | 152—370 |
| 2,659,119 | 11/1953 | Peterson. | |
| 2,967,558 | 1/1961 | Urbon | 152—429 |
| 3,091,023 | 5/1963 | Carlson | 29—400 |
| 3,097,682 | 7/1963 | Harkins | 152—429 |
| 3,153,846 | 10/1964 | Lindberg | 29—400 |
| 3,190,338 | 6/1965 | Wolfe | 152—370 |

FOREIGN PATENTS 165,087   12/1921   Great Britain.

ARTHUR L. LA POINT, *Primary Examiner.*

MILTON BUCHLER, *Examiner.*

C. W. HAEFELE, *Assistant Examiner.*